United States Patent
Kang et al.

(10) Patent No.: US 11,014,846 B2
(45) Date of Patent: May 25, 2021

(54) SCALING RESISTANT CERAMIC GLAZE AND FUNCTIONAL OVERGLAZE FOR Q345 HOT ROLLED ALLOY STEEL DOUBLE SIDED ENAMELING

(71) Applicant: Jiangxi Kosen Entech Co., Ltd., Yichun (CN)

(72) Inventors: Lihua Kang, Yichun (CN); Wei Sheng, Yichun (CN); Xiaofang Huang, Yichun (CN)

(73) Assignee: Jiangxi Kosen Entech Co., Ltd., Yichun (CN)

( * ) Notice: Subject to any disclaimer, the term of this patent is extended or adjusted under 35 U.S.C. 154(b) by 131 days.

(21) Appl. No.: 16/248,123

(22) Filed: Jan. 15, 2019

(65) Prior Publication Data

US 2019/0144330 A1 May 16, 2019

Related U.S. Application Data

(63) Continuation of application No. PCT/CN2017/092926, filed on Jul. 14, 2017.

(30) Foreign Application Priority Data

Jul. 15, 2016 (CN) .......................... 201610559592.X

(51) Int. Cl.
*C03C 8/06* (2006.01)
*C03C 3/118* (2006.01)
*C03C 4/20* (2006.01)
*C23D 5/02* (2006.01)

(52) U.S. Cl.
CPC ................ *C03C 8/06* (2013.01); *C03C 3/118* (2013.01); *C03C 4/20* (2013.01); *C03C 2204/00* (2013.01); *C03C 2207/02* (2013.01); *C03C 2207/04* (2013.01); *C23D 5/02* (2013.01)

(58) Field of Classification Search
CPC ....... C03C 8/06; C03C 3/118; C03C 2207/02; C03C 2207/04; C03C 2204/00; C03C 8/00; C03C 8/20
See application file for complete search history.

(56) References Cited

U.S. PATENT DOCUMENTS

| 5,204,291 A | * | 4/1993 | Nigrin | ....................... C03C 8/02 |
| | | | | 501/21 |
| 7,265,069 B2 | * | 9/2007 | Sakoske | ................ C03B 27/012 |
| | | | | 501/27 |
| 2006/0025298 A1 | * | 2/2006 | Emlemdi | .................. C03C 8/04 |
| | | | | 501/26 |

FOREIGN PATENT DOCUMENTS

| CN | 1037933 A | 12/1989 |
| CN | 1051075 A | 5/1991 |
| CN | 1291594 A | 4/2001 |
| CN | 102786224 A | 11/2012 |
| CN | 103864303 A | 6/2014 |
| CN | 106186690 A | 12/2016 |
| CN | 106242295 A | 12/2016 |
| EP | 1167310 A1 | 1/2002 |
| JP | S60118649 A | 6/1985 |
| WO | WO-2018010692 A1 | 1/2018 |

OTHER PUBLICATIONS

"Chinese Application No. 201610559592.X, First Office Action dated Feb. 28, 2018", (dated Feb. 28, 2018), 8 pgs.
"Chinese Application No. 201610559592.X, First Search dated Feb. 14, 2018", (dated Feb. 14, 2018), 2 pgs.
"International Application No. PCT/CN2017/092926, International Search Report and Written Opinion dated Oct. 16, 2017", (dated Oct. 16, 2017), 12 pgs.

* cited by examiner

*Primary Examiner* — Noah S Wiese

(74) *Attorney, Agent, or Firm* — Schwegman Lundberg & Woessner P.A.

(57) ABSTRACT

A scaling resistant ceramic glaze and a functional overglaze for Q345 hot rolled alloy steel double sided enameling. The components and the weight percentage of each component of the ground glaze of the enamel are as follows: 3-6% of $Al_2O_3$, 60-70% of $SiO_2$; 10-15% of $B_2O_3$, 10-15% of $Na_2O+K_2O+Li_2O$, 3-6% of $CaF_2$, 3-6% of $ZrO_2$, 2-5% of $CoO+NiO$, 1-3% of $BaMoO_4+Sb_2O_3$, 0.3-1.5 of $WO_3$. The ground glaze is prepared by formulating chemical raw materials in a weight ratio converted by the described chemical composition, stirring thoroughly and mixing uniformly, melting same in a rotary furnace at 1200-1350° C., and then quenching the melt. The provided scaling resistant ceramic glaze and functional overglaze for Q345 hot rolled alloy steel double sided enameling can be applied to Q345 steel that contains C, P, S and the like which are considered harmful elements and contains a variety of common alloy elements.

4 Claims, No Drawings

SCALING RESISTANT CERAMIC GLAZE AND FUNCTIONAL OVERGLAZE FOR Q345 HOT ROLLED ALLOY STEEL DOUBLE SIDED ENAMELING

CROSS-REFERENCE TO RELATED APPLICATIONS

This application is a continuation application of International Application No. PCT/CN2017/092926, filed Jul. 14, 2017, which claims priority to Chinese patent application No. CN201610559592.X, filed with the China National Intellectual Property Administration on Jul. 15, 2016 and entitled "Scaling Resistant Ceramic Glaze and Functional Overglaze for Q345 Hot Rolled Alloy Steel Double Sided Enameling," the contents of which are incorporated herein by reference in their entirety.

TECHNICAL FIELD

The present disclosure relates to the field of composite materials of steel surface, and particularly to a scaling resistant ceramic glaze and a functional overglaze for Q345 (i.e. A572MGr and A633MGr according to American standards) hot rolled alloy steel with double-side enamel.

BACKGROUND ART

Steels are the most widely used metal materials in the world, with low cost but excellent mechanical properties, but iron element is easy to oxidize and rust in the environment, especially with relatively poor resistance to acid and alkali corrosion. In recent years, many kinds of special-purpose stainless steels, weathering steels and special-purpose steels resistant to corrosion of various mediums have been developed in the metallurgical industry. However, for numerous corrosive mediums, no products with good mechanical properties, low cost and high cost performance in corrosion resistance have been found at present. Q345 steel (i.e. A572MGr and A633MGr steels according to American standards), whether it is a plate, pipe or structural profile, can almost meet the mechanical performance requirements of most engineering conditions. At present, it is widely used as engineering structural steel for buildings, bridges, vehicles, ships, and pressure vessels, etc. Therefore, to composite a corrosion-resistant enamel material onto the two surfaces of a Q345 hot rolled material is of extremely important practical significance and economic value. During the implementation of double sided enameling on the surface of a hot rolled steel, scaling is a defect that is most likely to occur during production and is also the most harmful defect. However, the exposure of such defects is often delayed and sometimes occurs after several days or even after several months, which brings tremendous troubles and inconvenience in the aspect of the product quality of the manufacturers, and even causes serious quality accidents and tremendous economic losses. According to the modern theory of metal enamel, the hydrogen melted in the steel, the hydrogen brought in by surface treatment, and the hydrogen produced by the reaction during the enameling process are dissolved in the steel plate base material during the enameling process, and when the enameling is finished and the product is cooled, or when the external temperature is changed, hydrogen will overflow to compress the ceramic layer, which is the main cause of scaling, also known as the "hydrogen overflow theory". However, as to how to prevent this, there are many different opinions, but no ideal method has been found. At present, the foregoing problem is mainly solved by the following methods both at home and abroad. The first method is steel modification, which is implemented mainly by zero carbon treatment and addition of alloy with functional group for hydrogen fixation to reduce the harm of hydrogen overflow. Therefore, many iron and steel enterprises have launched a variety of specific steel plates for enameling. In terms of the use effect, the specific cold rolled steel plates for enameling have certain effect on preventing scaling, but there is no record of completely preventing scaling. In particular, for hot rolled steels, no product has been ensured to be completely free of scaling. Secondly, solutions are sought from the enameling process, e.g., the so-called "insulation firing", that is, high temperature is maintained several hours before and after enameling to maximize hydrogen overflow. Although this process is effective, it still cannot ensure that scaling is prevented completely, and at the same time, the cost is increased tremendously, and the process is not environmentally friendly.

The present disclosure relates to a scaling resistant ceramic glaze and a functional overglaze for Q345 hot rolled alloy steel with double-side enamel, in which the design concept of ceramic glaze has been innovated, and a broader spectrum of scaling resistant ceramic glazes and functional overglazes have been invented by the method of combination of dredging and blocking. It has been proved, by repeated tests and use, and quality tracking, that they can be applied to Q345 steel that contains C, P, S and the like which are considered harmful elements and contains a variety of common alloy elements, and various steels of lower grades. The industrial enamelware made of the scaling resistant ceramic glaze and the functional overglaze marks a new stage on the aspect of the range of the steel materials that can be enameled on both sides, on the aspect of the improvement of the mechanical strength of the enamelware, and on the aspect of the reduction in the cost of the industrial products with double-side enamel.

Today, with the increasing awareness of environmental protection and the higher requirements on industrial production, for example, for some water treatment facilities, medical and chemical facilities, petrochemical facilities, mining facilities, seawater desalination plants, nuclear power plant with seawater cooling system, and marine engineering equipment, etc., there is a wide demand for Q345 surface composite component materials with double-side enamel, which has strong mechanical properties, such as enamel assembled tanks and assembled water tanks for biogas projects and sewage treatment projects, enamel lining plates for chutes in mines, enamel anti-corrosion pipes for petrochemical industry, inner walls of enamel assembled chimney for large chimneys, and seawater resistant enamel pipes for nuclear power plants, which are all widely needed on the market. In the present discourse, no expensive special enamel steel is used (the special enamel steel either cannot be ensured to be free of scaling), and there is also no need to use complex and expensive enamel heat preservation technology (this technology is not mature at present). Instead, low-cost double-sided enamel structural members suitable for various functions are produced by the means of the ceramic glaze and the two-enameling and two-firing process, by enameling double sides of common Q345 material with scaling resistant ground glaze and then spraying of enameling functional enamel overglaze.

SUMMARY

The present disclosure provides a scaling resistant ceramic glaze and a functional overglaze for Q345 hot rolled alloy steel with double-side enamel, which are specifically as follows:

The chemical composition (by weight percentage) of a scaling resistant enamel ground glaze for Q345 steel:

| | |
|---|---|
| $Al_2O_3$ | 3-6% |
| $SiO_2$ | 60-70% |
| $B_2O_3$ | 10-15% |
| $Na_2O + K_2O + Li_2O$ | 10-15% |
| $CaF_2$ | 3-6% |
| $ZrO_2$ | 3-6% |
| $CoO + NiO$ | 2-5% |
| $BaMoO_4 + Sb_2O_3$ | 1-3% |
| $WO_3$ | 0.3-1.5%. |

The ground glaze is prepared by formulating chemical raw materials in a weight ratio converted by the above described chemical composition, stirring thoroughly and mixing uniformly, melting the same in a rotary furnace at 1200-1350° C., and then cold quenching the melt.

The enameling process of Q345 material enamel ground glaze:

Ceramic glaze and commonly used grinding feed, barium molybdate, borax, nitrite, antimony oxide, etc. are ball-milled according to different grinding ratios to prepare a slurry. The bulk weight and adhesion amount of the resultant glaze slurry are adjusted, according to different materials and different products, for immersion or powder spraying. The thickness of the ceramic layer is controlled at 0.1-0.3 mm, the reference temperature for firing is controlled at 850-950° C., and the firing time is determined according to the color, gloss and adherence of the ceramic surface.

The bulk weight of immersion is controlled at 168-175 (g/100 ml), and powder spraying is controlled at 162-168 (g/100 ml).

According to different surface function requirements, different special functional overglazes can be used. Most of the broad-spectrum functional overglazes can be matched with their respective ground glazes, but a few overglazes need to be specially prepared: the special overglazes are as follows, respectively:

Q345 steel alkali-resistant zirconium overglaze (A), with the chemical composition (by weight percentage):

| | |
|---|---|
| $Al_2O_3$ | 1-3% |
| $SiO_2$ | 55-65% |
| $B_2O_3$ | 5-8% |
| $SrO$ | 3-6% |
| $Na_2O + K_2O + Li_2O$ | 10-15% |
| $Na_2SiF_6$ | 2-6% |
| $ZrO_2$ | 6-10% |
| $Cr_2O_3 + MnO_2$ | 2-5%. |

The overglaze is prepared by formulating chemical raw materials in a weight ratio converted by the described chemical composition, stirring thoroughly and mixing uniformly, melting the same in a rotary furnace at 1200-1350° C., and then cold quenching the melt. Ceramic glaze and commonly used grinding feed, barium molybdate, borax, nitrite, antimony oxide, etc. are ball-milled according to different grinding ratios to prepare a slurry. The bulk weight and adhesion amount of the resultant glaze slurry are adjusted, according to different materials and different products, for immersion or powder spraying. The thickness of the ceramic layer is controlled at 0.1-0.3 mm, the reference temperature for firing is controlled at 820-880° C., and the firing time is determined according to the color, gloss and adherence of the ceramic surface.

Q345 steel acid-resistant blue overglaze (AA), with the chemical composition (by weight percentage):

| | |
|---|---|
| $Al_2O_3$ | 1-3% |
| $SiO_2$ | 62-70% |
| $B_2O_3$ | 5-8% |
| $SrO$ | 3-6% |
| $Na_2O + K_2O + Li_2O$ | 10-15% |
| $Na_2SiF_6$ | 2-4% |
| $ZrO_2$ | 3-6% |
| $TiO_2$ | 3-6% |
| $CoO$ | 1-2%. |

The overglaze is prepared by formulating chemical raw materials in a weight ratio converted by the described chemical composition, stirring thoroughly and mixing uniformly, melting same in a rotary furnace at 1200-1350° C., and then cold quenching the melt. Ceramic glaze and commonly used grinding feed, barium molybdate, borax, nitrite, antimony oxide, etc. are ball-milled according to different grinding ratios to prepare a slurry. The bulk weight and adhesion amount of the resultant glaze slurry are adjusted, according to different materials and different products, for immersion or powder spraying. The thickness of the ceramic layer is controlled at 0.1-0.3 mm, the reference temperature for firing is controlled at 850-900° C., and the firing time is determined according to the color, gloss and adherence of the ceramic surface.

Compared with the prior art, the present disclosure has the following advantageous effects:

The scaling resistant ceramic glaze and functional overglaze for Q345 hot rolled alloy steel with double-side enamel provided in the present disclosure have innovated the design concept of ceramic glaze, employed the method of combination of dredging and blocking, and can be applied to Q345 steel that contains C, P, S and the like which are considered harmful elements and contains a variety of common alloy elements, and various steels of lower grades. The industrial enamelware made of the scaling resistant ceramic glaze and the functional overglaze marks a new stage on the aspect of the range of the steel materials that can be enameled on both sides, on the aspect of the improvement of the mechanical strength of the enamelware, and on the aspect of the reduction in the cost of the double sided enameled industrial products.

In the present discourse, no expensive special enamel steel is used (the special enamel steel either cannot be ensured to be free of scaling), and there is also no need to use complex and expensive enamel heat preservation process (such process is not mature at present). Instead, low-cost double-sided enamel structural members suitable for various functions are produced by the means of the ceramic glaze and the two-enameling and two-firing process, by enameling common Q345 material with scaling resistant ground glaze on both sides, and then spraying of enameling functional enamel overglaze.

DETAILED DESCRIPTION OF EMBODIMENTS

The embodiments of the present disclosure will be described below in detail in connection with examples. However, it will be understood by those skilled in the art that the examples described below are only intended to illustrate the present disclosure, but should not be considered as limiting the scope of the present disclosure. Where no particular conditions are specified, examples are carried out in accordance with conventional conditions or conditions recommended by the manufacturer. All of the reagents or instruments used, whose manufacturers are not specified, are conventional products that are commercially available.

Example 1

A method for preparing a scaling resistant ground glaze for common Q345 hot rolled steel member with double-side enamel:

The components and the weight percentage of each component of the enamel ground glaze are as follows: 3% of $Al_2O_3$, 62% of $SiO_2$, 14% of $B_2O_3$, 11.7% of $Na_2O+K_2O+Li_2O$, 3% of $CaF_2$, 3% of $ZrO_2$, 2% of $CoO+NiO$, 1% of $BaMo_4+Sb_2O_3$, and 0.3% of $WO_3$.

The ground glaze is prepared by formulating chemical raw materials in a weight ratio converted by the foregoing chemical composition, stirring thoroughly and mixing uniformly, melting the same in a rotary furnace at 1200-1350° C., and then cold quenching the melt.

A method of using the scaling resistant ground glaze for common Q345 hot rolled steel member with double-side enamel:

The prepared enamel ground glaze and commonly used grinding feed, barium molybdate, borax, nitrite, antimony oxide, etc. are ball-milled according to different grinding ratios to prepare a slurry. The bulk weight and adhesion amount of the resultant glaze slurry are adjusted, according to different materials and different products, for immersion. The thickness of the ceramic layer is controlled at 0.2 mm, the firing temperature is controlled at 850-950° C., and the firing time is determined according to the color, gloss and adherence of the ceramic surface. The typical bulk weight of immersion is controlled at 168 (g/100 ml).

Example 2

A method for preparing a scaling resistant ground glaze for common Q345 hot rolled steel member with double-side enamel:

The components and the weight percentage of each component of the ground glaze for the enamel are as follows: 6% of $Al_2O_3$. 60% of $SiO_2$, 10% of $B_2O_3$, 10% of $Na_2O+K_2O+Li_2O$, 3.5% of $CaF_2$, 3.5% of $ZrO_2$, 2.5% of $CoO+NiO$, 3% of $BaMoO_4+Sb_2O_3$, and 1.5% of $WO_3$.

The ground glaze is prepared by formulating chemical raw materials in a weight ratio converted by the foregoing chemical composition, stirring thoroughly and mixing uniformly, melting the same in a rotary furnace at 1200-1350° C., and then cold quenching the melt.

A method of using the foregoing scaling resistant ground glaze for common Q345 hot rolled steel member with double-side enamel:

The prepared enamel ground glaze and commonly used grinding feed, barium molybdate, borax, nitrite, antimony oxide, etc. are ball-milled according to different grinding ratios to prepare a slurry. The bulk weight and adhesion amount of the resultant glaze slurry are adjusted, according to different materials and different products, for powder spraying. The thickness of the ceramic layer is controlled at 0.3 mm, the firing temperature is controlled at 850-950° C., and the firing time is determined according to the color, gloss and adherence of the ceramic surface. The typical bulk weight for wet powder spraying is controlled at 162 (g/100 ml).

Example 3

A method for preparing a scaling resistant ground glaze for common Q345 hot rolled steel member with double-side enamel:

The components and the weight percentage of each component of the enamel ground glaze are as follows: 3% of $Al_2O_3$, 60% of $SiO_2$, 11% of $B_2O_3$, 15% of $Na_2O+K_2O+Li_2O$, 3% of $CaF_2$, 3% of $ZrO_2$, 2.5% of $CoO+NiO$, 2% of $BaMoO_4+Sb_2O_3$, and 0.5% of $WO_3$.

The ground glaze is prepared by formulating chemical raw materials in a weight ratio converted by the foregoing chemical composition, stirring thoroughly and mixing uniformly, melting the same in a rotary furnace at 1200-1350° C., and then cold quenching the melt.

A method of using the foregoing scaling resistant ground glaze for common Q345 hot rolled steel member with double-side enamel:

The prepared enamel ground glaze and commonly used grinding feed, barium molybdate, borax, nitrite, antimony oxide, etc. are ball-milled according to different grinding ratios to prepare a slurry. The bulk weight and adhesion amount of the resultant glaze slurry are adjusted, according to different materials and different products, for immersion. The thickness of the ceramic layer is controlled at 0.1 mm, the firing temperature is controlled at 850-950° C., and the firing time is determined according to the color, gloss and adherence of the ceramic surface. The typical bulk weight for immersion is controlled at 175 (g/100 ml).

Example 4

A method for preparing an alkali-resistant zirconium overglaze (A) for Q345 steel:

The components and the weight percentage of each component of the alkali-resistant zirconium overglaze are as follows: 3% of $Al_2O_3$, 65% of $SiO_2$, 8% of $B_2O_3$, 3% of $SrO$, 10% of $Na_2O+K_2O+Li_2O$, 2% of $Na_2SiF_6$, 6% of $ZrO_2$, and 3% of $Cr_2O_3+MnO_2$.

The alkali-resistant zirconium overglaze is prepared by formulating chemical raw materials in a weight ratio converted by the foregoing chemical composition, stirring thoroughly and mixing uniformly, melting the same in a rotary furnace at 1200-1350° C., and then cold quenching the melt.

A method of using the foregoing alkali-resistant zirconium overglaze (A):

Ceramic glaze and commonly used grinding feed, barium molybdate, borax, nitrite, antimony oxide, etc. are ball-milled according to different grinding ratios to prepare a slurry. The bulk weight and adhesion amount of the resultant glaze slurry are adjusted, according to different materials and different products, for immersion. The thickness of the ceramic layer is controlled at 0.1 mm, the reference temperature for firing is controlled at 820-880° C., and the firing time is determined according to the color, gloss and adherence of the ceramic surface.

Example 5

A method for preparing an alkali-resistant zirconium overglaze (A) for Q345 steel:

The components and the weight percentage of each component of the alkali-resistant zirconium overglaze are as follows: 2% of $Al_2O_3$, 57% of $SiO_2$, 6% of $B_2O_3$, 4% of $SrO$, 14% of $Na_2O+K_2O+Li_2O$, 5% of $Na_2SiF_6$, 10% of $ZrO_2$, and 2% of $Cr_2O_3+MnO_2$.

The alkali-resistant zirconium overglaze is prepared by formulating chemical raw materials in a weight ratio converted by the foregoing chemical composition, stirring thoroughly and mixing uniformly, melting the same in a rotary furnace at 1200-1350° C., and then cold quenching the melt.

A method of using the foregoing alkali-resistant zirconium overglaze (A):

Ceramic glaze and commonly used grinding feed, barium molybdate, borax, nitrite, antimony oxide, etc. are ball-milled according to different grinding ratios to prepare a slurry. The bulk weight and adhesion amount of the resultant glaze slurry are adjusted, according to different materials and different products, for powder spraying. The thickness of the ceramic layer is controlled at 0.3 mm, the reference temperature for firing is controlled at 820-880° C., and the firing time is determined according to the color, gloss and adherence of the ceramic surface.

Example 6

A method for preparing an alkali-resistant zirconium overglaze (A) for Q345 steel:

The components and the weight percentage of each component of the alkali-resistant zirconium overglaze are as follows: 1% of $Al_2O_3$, 55% of $SiO_2$, 5% of $B_2O_3$, 3% of SrO, 15% of $Na_2O+K_2O+Li_2O$, 6% of $Na_2SiF_6$, 10% of $ZrO_2$, and 5% of $Cr_2O_3+MnO_2$.

The alkali-resistant zirconium overglaze is prepared by formulating chemical raw materials in a weight ratio converted by the foregoing chemical composition, stirring thoroughly and mixing uniformly, melting the same in a rotary furnace at 1200-1350° C., and then cold quenching the melt.

A method of using the foregoing alkali-resistant zirconium overglaze (A):

Ceramic glaze and commonly used grinding feed, barium molybdate, borax, nitrite, antimony oxide, etc. are ball-milled according to different grinding ratios to prepare a slurry. The bulk weight and adhesion amount of the resultant glaze slurry are adjusted, according to different materials and different products, for powder spraying. The thickness of the ceramic layer is controlled at 0.2 mm, the reference temperature for firing is controlled at 820-880° C., and the firing time is determined according to the color, gloss and adherence of the ceramic surface.

Example 7

A method for preparing an acid-resistant blue overglaze (AA) for Q345 steel:

The components and the weight percentage of each component of the acid-resistant blue overglaze are as follows: 3% of $Al_2O_3$, 70% of $SiO_2$, 5% of $B_2O_3$, 3% of SrO, 10% of $Na_2O+K_2O+Li_2O$, 2% of $Na_2SiF_6$, 3% of $ZrO_2$, 3% of $TiO_2$, and 1% of CoO.

The acid-resistant blue overglaze is prepared by formulating chemical raw materials in a weight ratio converted by the foregoing chemical composition, stirring thoroughly and mixing uniformly, melting the same in a rotary furnace at 1200-1350° C., and then cold quenching the melt.

A method of using the acid-resistant blue overglaze (AA) for common Q345 hot rolled steel member with double-side enamel:

Ceramic glaze and commonly used grinding feed, barium molybdate, borax, nitrite, antimony oxide, etc. are ball-milled according to different grinding ratios to prepare a slurry. The bulk weight and adhesion amount of the resultant glaze slurry are adjusted, according to different materials and different products, for powder spraying. The thickness of the ceramic layer is controlled at 0.3 mm, the firing temperature is controlled at 850-950° C., and the firing time is determined according to the color, gloss and adherence of the ceramic surface. The typical bulk weight for wet powder spraying is controlled at 168 (g/100 ml).

Example 8

A method for preparing an acid-resistant blue overglaze (AA) for Q345 steel:

The components and the weight percentage of each component of the acid-resistant blue overglaze are as follows: 3% of $Al_2O_3$, 63% of $SiO_2$, 5% of $B_2O_3$, 3% of SrO, 14% of $Na_2O+K_2O+Li_2O$, 2% of $Na_2SiF_6$, 3% of $ZrO_2$, 6% of $TiO_2$, and 1% of CoO.

The acid-resistant blue overglaze is prepared by formulating chemical raw materials in a weight ratio converted by the foregoing chemical composition, stirring thoroughly and mixing uniformly, melting the same in a rotary furnace at 1200-1350° C., and then cold quenching the melt.

A method of using the acid-resistant blue overglaze (AA) for common Q345 hot rolled steel member with double-side enamel:

Ceramic glaze and commonly used grinding feed, barium molybdate, borax, nitrite, antimony oxide, etc. are ball-milled according to different grinding ratios to prepare a slurry. The bulk weight and adhesion amount of the resultant glaze slurry are adjusted, according to different materials and different products, for immersion. The thickness of the ceramic layer is controlled at 0.1 mm, the firing temperature is controlled at 850-950° C., and the firing time is determined according to the color, gloss and adherence of the ceramic surface. The typical bulk weight for immersion is controlled at 168 (g/100 ml).

Example 9

A method for preparing an acid-resistant blue overglaze (AA) for Q345 steel:

The components and the weight percentage of each component of the acid-resistant blue overglaze are as follows: 1% of $Al_2O_3$, 62% of $SiO_2$, 6% of $B_2O_3$, 6% of SrO, 11% of $Na_2O+K_2O+Li_2O$, 4% of $Na_2SiF_6$, 4% of $ZrO_2$, 4% of $TiO_2$, and 2% of CoO.

The acid-resistant blue overglaze is prepared by formulating chemical raw materials in a weight ratio converted by the foregoing chemical composition, stirring thoroughly and mixing uniformly, melting the same in a rotary furnace at 1200-1350° C., and then cold quenching the melt.

A method of using the acid-resistant blue overglaze (AA) for common Q345 hot rolled steel member with double-side enamel:

Ceramic glaze and commonly used grinding feed, barium molybdate, borax, nitrite, antimony oxide, etc. are ball-milled according to different grinding ratios to prepare a slurry. The bulk weight and adhesion amount of the resultant glaze slurry are adjusted, according to different materials and different products, for immersion. The thickness of the ceramic layer is controlled at 0.2 mm, the firing temperature is controlled at 850-950° C., and the firing time is determined according to the color, gloss and adherence of the ceramic surface. The typical bulk weight for immersion is controlled at 175 (g/100 ml).

The enamel ground glaze and the functional overglaze prepared in the technical solutions of the present disclosure are suitable for structural profiles such as hot rolled steel plates, steel pipes, angle steels and I-beams, which are of Q345A, B, C, D, E and other grades, with different thicknesses of 3-40 mm, and subjected to surface treatment, such as acid cleaning, shot blasting, sand blasting, or not subjected to any surface treatment. Such structural profiles are used for either single-sided or local enameling, each of which can achieve excellent scaling resistant effect.

The examples described above are only some of the examples of the present disclosure, rather than all of the examples of the present disclosure. The detailed description of the examples of the present disclosure is not intended to limit the scope of the present disclosure claimed, but only represents the selected examples of the present disclosure. All the other examples that are obtained by a person of ordinary skills in the art on the basis of the examples of the present disclosure without inventive effort shall be covered by the protection scope of the present disclosure.

INDUSTRIAL APPLICABILITY

Thanks to the scaling resistant ceramic glaze and the functional overglaze for Q345 hot rolled alloy steel with double-side enamel in the present disclosure, the design concept of ceramic glaze has been innovated, and a broader spectrum of scaling resistant ceramic glazes and functional overglazes have been invented by the method of combination of dredging and blocking. It has been proved, by repeated tests and use, and quality tracking, that they can be applied to Q345 steel that contains C, P, S and the like which are considered harmful elements and contains a variety of common alloy elements, and various steels of lower grades. The industrial enamelware made of the scaling resistant ceramic glaze and the functional overglaze marks a new stage on the aspect of the range of the steel materials that can be enameled on both sides, on the aspect of the improvement of the mechanical strength of the enamelware, and on the aspect of the reduction in the cost of the double sided enameled industrial products.

In the present discourse, no expensive special enamel steel is used (the special enamel steel either cannot be ensured to be free of scaling), and there is also no need to use complex and expensive enamel heat preservation process (such process is not mature at present). Instead, low-cost structural members with enamel on both sides suitable for various functions are produced by the means of the ceramic glaze and the two-enameling and two-firing process, by enameling double sides of common Q345 material with scaling resistant ground glaze and then spraying of enameling functional enamel overglaze.

The invention claimed is:
1. A method of using a scaling resistant enamel ground glaze for Q345 hot rolled alloy steel with double-side enamel,
wherein the scaling resistant enamel ground glaze for Q345 hot rolled alloy steel with double-side enamel is ball-milled with grinding feed, barium molybdate, borax, nitrite, and antimony oxide to prepare a slurry, a bulk weight and an adhesion amount of resultant glaze slurry are adjusted, according to material type and product type, for immersion or powder spraying, wherein a firing temperature is controlled at 850-950° C., and a firing time is determined according to color, gloss and adherence of a ceramic surface;
wherein the enamel ground glaze comprises components in a weight percentage:

| | |
|---|---|
| $Al_2O_3$ | 3-6% |
| $SiO_2$ | 60-70% |
| $B_2O_3$ | 10-15% |
| $Na_2O + K_2O + Li_2O$ | 10-15% |
| $CaF_2$ | 3-6% |
| $ZrO_2$ | 3-6% |
| $CoO + NiO$ | 2-5% |
| $BaMoO_4 + Sb_2O_3$ | 1-3% |
| $WO_3$ | 0.3-1.5%; | the enamel ground glaze is prepared by formulating chemical raw materials in a weight ratio converted by the above chemical composition, stirring thoroughly and mixing uniformly, melting in a rotary furnace at 1200-1350° C., and then cold quenching.

2. The method of using the scaling resistant enamel ground glaze for Q345 hot rolled alloy steel with double-side enamel according to claim 1, wherein a thickness of a ceramic layer is controlled at 0.1-0.3 mm.

3. The method of using the scaling resistant enamel ground glaze for Q345 hot rolled alloy steel with double-side enamel according to claim 1, wherein a bulk weight for the immersion is controlled at 168-175 g/100 ml.

4. The method of using the scaling resistant enamel ground glaze for Q345 hot rolled alloy steel with double-side enamel according to claim 1,
wherein the bulk weight for wet powder spraying is controlled at 162-168 g/100 ml.

* * * * *